United States Patent [19]
Holt

[11] Patent Number: 4,751,684
[45] Date of Patent: Jun. 14, 1988

[54] SEARCH APPARATUS

[75] Inventor: Nicholas P. Holt, Hadfield, Via Hyde, Great Britain

[73] Assignee: International Computers Limited, London, England

[21] Appl. No.: 864,428

[22] Filed: May 19, 1986

[30] Foreign Application Priority Data

Jun. 19, 1985 [GB] United Kingdom ............... 8515482

[51] Int. Cl.⁴ .......................................... G06F 15/347
[52] U.S. Cl. .............................. 365/231; 340/825.02; 364/200; 370/54; 365/189
[58] Field of Search ................. 340/825.02; 364/200; 370/54; 365/230, 231, 189

[56] References Cited

U.S. PATENT DOCUMENTS

| | | | |
|---|---|---|---|
| 3,577,141 | 5/1971 | Quintero | 340/825.02 |
| 4,103,349 | 7/1978 | Marmet | 340/825.02 |
| 4,606,002 | 8/1986 | Waisman et al. | 364/200 |

FOREIGN PATENT DOCUMENTS

| | | | |
|---|---|---|---|
| 0588601 | 12/1959 | Canada | 340/825.02 |
| 0111689 | 6/1984 | European Pat. Off. | |
| 0124097 | 11/1984 | European Pat. Off. | |
| 0148008 | 7/1985 | European Pat. Off. | |
| 0170442 | 2/1986 | European Pat. Off. | |

*Primary Examiner*—Terrell W. Fears
*Attorney, Agent, or Firm*—Lee & Smith

[57] ABSTRACT

Search apparatus is described for locating an item which satisfies a predetermined criterion e.g. an instruction ready for execution or a free block of data. The apparatus uses a tree structure where each terminal node represents one of the items and is set if that item satisfies the criterion. A non-terminal node is set if any of its subordinate nodes is set. In order to locate an item, a path is traced through the tree, starting at the root node and passing through a series of set nodes until a set terminal node is reached.

6 Claims, 2 Drawing Sheets

SEARCH APPARATUS

This invention relates to search apparatus for locating, in a collection of items, an item which satisfies a predetermined criterion.

The invention is particularly, although not exclusively, applicable in a parallel data processing system in which instructions are not executed sequentially, as in the conventional Von Neumann architecture, but may be executed at any time after they become ready for execution, e.g. when all the necessary operands are available. In such a system, there may at any given instant be several instructions ready for execution, and it is necessary to provide some way of rapidly locating these instructions. This could be done by maintaining a list of identifiers pointing to those instructions that are ready for execution. However, this implies a considerable overhead in terms of storage costs and store access required to maintain the list. An alternative way would be to mark those instructions eligible for execution with an indication flag. The problem is then to locate, among all the instructions in the store, those with their flags set. This could be done by scanning through each location of the store in turn, but this would take an excessively long time. Alternatively, the flags could be stored in a contentsaddressable memory, but such memories are very expensive.

A similar problem arises in the allocation of storage in a parallel data processing system. Generally, the store is organised as a set of cells, which are allocated as required, and are released into a pool of tree cells when no longer required. The task of locating a free cell is precisely analogous to that of finding an executable instruction.

An object of the invention is to provide an improved search apparatus which does not suffer from the disadvantage referred to above.

SUMMARY OF THE INVENTION

According to the invention there is provided search apparatus comprising:
(a) means for maintaining a representation of a tree structure comprising a plurality of interconnected nodes including a root node and a plurality of terminal nodes, each node being set to a predetermined state if any one of its subordinate nodes is set in a predetermined state, and
(b) means for following a path through the tree, starting from the root node and passing through a series of nodes all of which are set in their predetermined states until a terminal node in its predetermined state is reached.

One embodiment of the invention will now be described by way of example with reference to the accompanying drawings.

BRIEEF DESCRIPTION OF THE DRAWINGS

DESCRIPTION OF AN EMBODIMENT OF THE INVENTION

Figure 1:
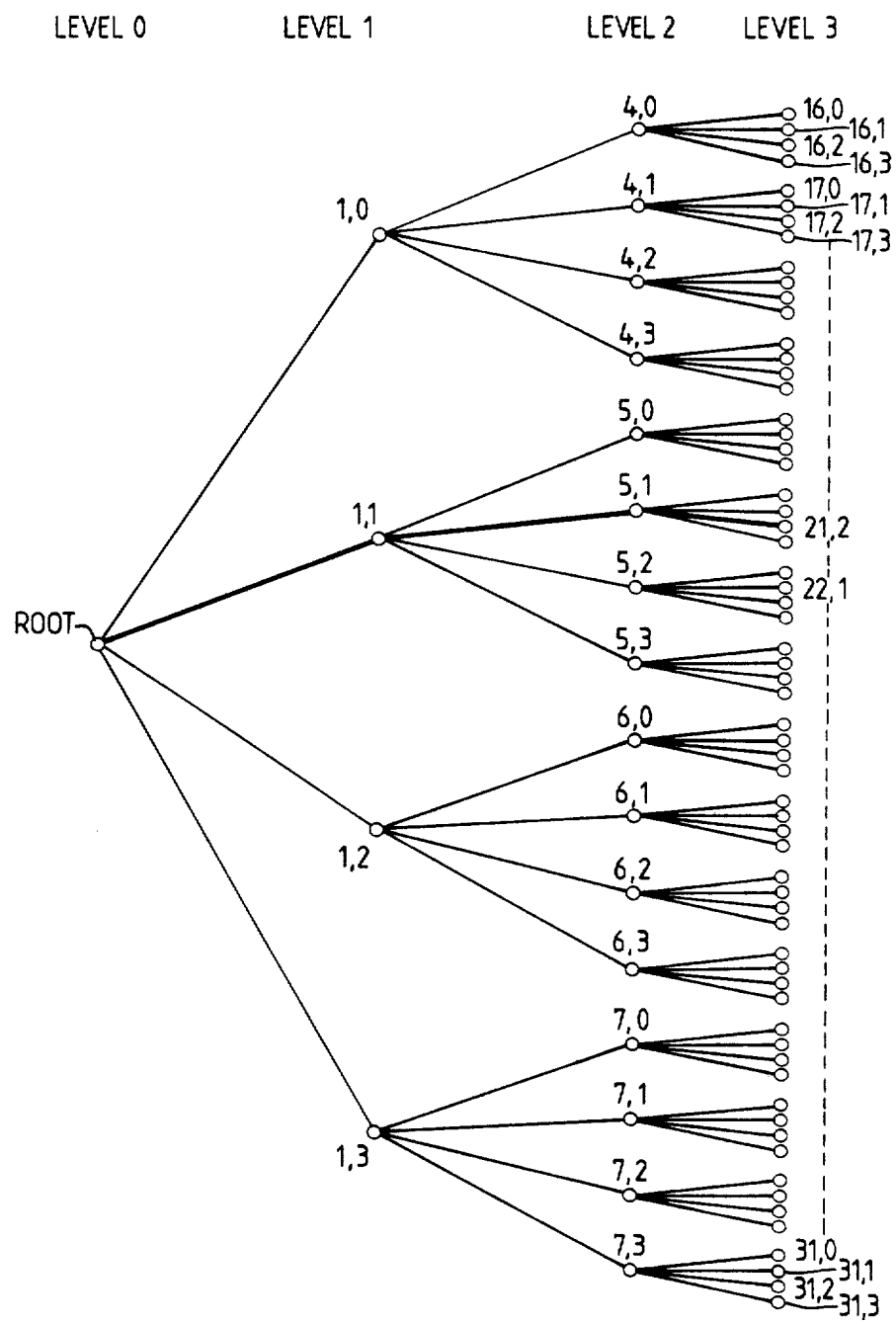
FIG. 1 is a diagram representing a tree structure.

Referring to FIG. 1, this shows a tree structure consisting of a number of nodes, represented by circles, arranged in four levels. The highest level (level 0) contains a single node, referred to as the root node, and the lowest level (level 3) contains 64 nodes, referred to as terminal nodes or leaves. Each non-terminal node (i.e. each node other than a leaf) is connected to four subordinate nodes at the next lowest level of the tree; that is, the tree has a branching factor of four.

The 64 leaves correspond respectively to 64 items, and are set to indicate whether these items satisfy a predetermined criterion. For example, the leaves may correspond to instructions in a store, and are set to indicate whether the instructions are ready for execution. Alternatively, the leaves may correspond to data storage cells, and are set to indicate whether the cells are free.

Each node (other than the root) is allocated a number x,y as shown in FIG. 1. As can be seen, the four nodes at level 1 are allocated the numbers 1,0 to 1,3; the iour nodes subsidiary to node 10 are allocated the numbers 4,0 to 4,3; and so on. In general, the four nodes subsidiary to node x,y are allocated the numbers $4x+y$, 0 to $4x+y$, 3.

A non-terminal node is set if any one of its subordinate nodes or leaves is set. For example, if the leaf 21,2 is set, then the nodes 5,1 and 1,1 and also the root node must be set. It can be seen that a set leaf node can be quickly located by tracing a path through the tree, starting at the root node and passing from each node to one of its subordinate nodes which is also set, until a leaf is reached. Such a path is indicated by a heavy line in FIG. 1. Whenever the status of an item changes, it is necessary to update the corresponding leaf of the tree. For example, when an instruction becomes available for execution, the corresponding leaf is set; conversely, when an instruction has been executed, the corresponding leaf is reset to its original unset state. Whenever a leaf is updated, the change must be propagated up to the higher levels of the tree, according to the following rules:
(i) A node is set if all its subsidiary nodes were unset and one has just been set.
(ii) A node is reset if all but one of its subsidiary nodes were unset and that one has just been reset.

For example, if the leaf 22,1 in FIG. 1 is set, then the change must be propagated up to the next level by setting the node 5,2 at level 2. It is not necessary to propagate the change any further, since the relevant node 1,1 at level 1 is already set, as a result of the previous setting of node 21,2.

Figure 2:
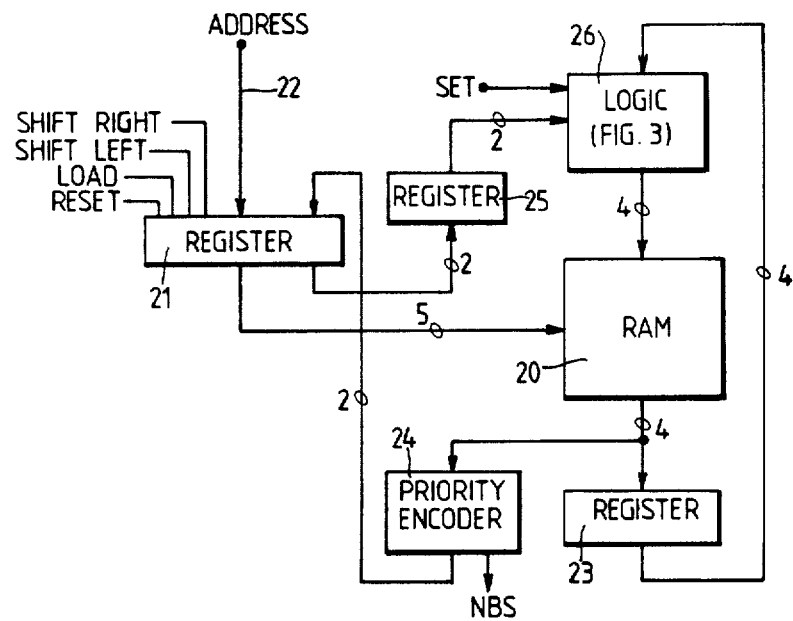
FIG. 2 is a block diagram of a search apparatus in accordance with the invention.

Referring now to FIG. 2, this shows search apparatus which utilises the tree structure described above. The tree structure is held in a random access memory (RAM) 20, having 32 locations (0–31) each having four bit positions (0–3). Each node of the tree structure, except for the root node, is represented by one bit of the RAM. Specifically, each node x,y in FIG. 1 is represented by bit position y of location x of the RAM. Thus, it can be seen that the four nodes at level 1 are represented by the four bits of location 1 in the RAM; the sixteen nodes at level 2 are represented by locations 4 to 7; and the 64 leaves at level 3 are represented by locations 16 to 31. The other locations of the RAM are unused. It should be noted that the node corresponding to bit y of location x has its four subsidiary nodes (or leaves) stored in the four bits of location $4x+y$.

The RAM 20 is addressed by the five least significant bits of an eight-bit address register 21. This register has a RESET control which resets it to the value one; a LOAD control which causes it to be loaded in parallel from an input path 22; and SHIFT LEFT and- SHIFT RIGHT controls which cause it to be shifted left or right. The data output of the RAM 20 is fed to a four-bit data register 23. It is also fed to a priority encoder 24 which produces a 2-bit priority code representing the position of the first (i.e. leftmost) set bit in the data output. If none of the data bits is set, the encoder produces a signal NBS. The 2-bit priority code can be inserted into the two least significant (i.e. rightmost) bit positions of the address register 21. Alternatively, the contents of these two least significant bit positions can be loaded into a 2-bit control register 25.

The data input to the RAM comes from a logic circuit 26, which in turn is connected to the data register 23 and is controlled by the contents of the control register 25 and by a control signal SET.

Figure 3:
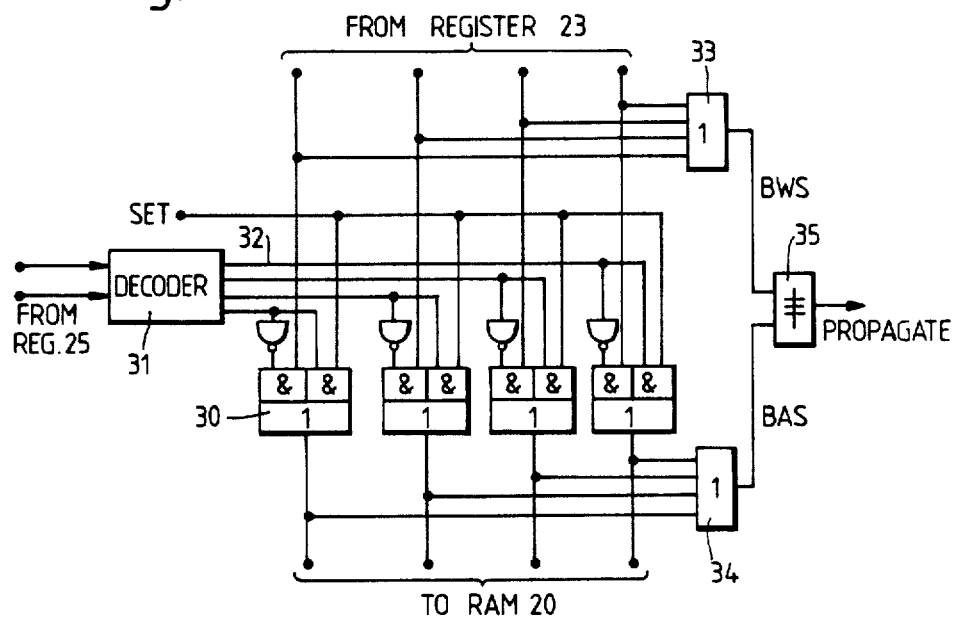
FIG. 3 is a logic diagram showing part of the apparatus in more detail.

Referring now to FIG. 3, this shows the logic circuit 26 in detail. The circuit includes four selection circuits 30, the outputs of which are connected to the data input of the RAM 20. The first inputs of the circuits 30 are connected to receive data from the data register 23. The other inputs all receive the SET signal. The logic circuit 26 also includes a decoder 31 which decodes the contents of the control register 25 to produce a signal on one of four lines 32. This causes one of the four circuits 30 to select its second input, while the other three all select their first inputs.

Thus, it can be seen that the logic circuit receives the data output of the RAM by way of the data register 23. It then updates the data by setting the bit specified by the control register 25 to the value specified by the signal SET, the other bits being unchanged. The updated data can then be written back into the RAM. The four input data bits to the logic circuit 26 are combined in an OR gate 33 to produce a signal BWS which indicates that at least one of the data bits was already set prior to updating by the circuit. The four output bits are combined in an OR gate 34 to produce a signal BAS to indicate that at least one of the data bits is set after updating. The signals BWS and BAS are combined in a non-equivalence gate 35 to produce a signal PROPAGATE. It can be seen that this signal is true wherever an update has to be propagated to the next higher level of the tree in accordance with the rules specified above.

The way in which the search apparatus is operated in order to find a set leaf is as follows:
(1) Initially the address register 21 is set to the value one so that it points to the location in the RAM 20 that holds the four level 1 nodes.
(2) The RAM 20 is then accessed at the location defined by the address register.
(3) The data output from the RAM is loaded into data register 23.
(4) The data output from the RAM is processed by the priority encoder 24, so as to produce a code indicating the position of the first set bit of the RAM output. If none of the bits is set, the signal NBS is produced. This indicates that none of the leaves is set, and therefore the search is terminated.
(5) The address register 21 is shifted left by two bit positions, and the code from the priority encoder 24 is inserted into the least significant (i.e. right-hand) end of the register. The effect of this is to multiply the address (x) by four and to add on the output (y) of the priority encoder, so as to form the address 4x+y of the location containing the four subsidiary nodes of the node represented by bit x,y.
(6) If the contents of the address register are now greater than or equal to 64, the search is terminated. The least significant six bits then indicate the identity of a set leaf (in the range 0–63), and represent the output of the search apparatus. The contents of the data register 23 indicate whether there are any other set leaves subordinate to the same node at the next higher level.

On the other hand, if the contents of the address register are less than 64, the above sequence is repeated from step (2).

It can be seen that step (4) selects a set node from the currently addressed location of RAM 20. Step (5) then updates the address register 21 so as to point to the location containing the four nodes subordinate to the selected node. This cycle is repeated, progressing to the next lower level of the tree at each cycle, until eventually a leaf node is selected. The procedure therefore traces a path through the three from the root node to a set leaf.

The way in which the tree structure is updated will now be described.
(1) The identity of the leaf node to be updated (in the range 0–63) has 64 added to it and the result is loaded into the address register 21.
(2) The address register is then shifted right by two bit positions, inserting zeroes into the most significant (i.e. left-hand) end of the register. The original contents of the least significant two bit positions are loaded into the control register 25. The effect of this is to divide the contents of the address register by four, putting the remainder in the register 25. he RAM 20 is now accessed at the location
(3) The RAM 20 is now accessed at the location defined by the address register.
(4) The output data from the RAM is loaded into the data register 23.
(5) The data from register 23 is then processed by the logic circuit 26, to set or clear the bit indicated by the contents of the control register 25 according to the state of the SET control signal. The other bits in the data are unchanged.
(6) The output of the logic circuit 26 is then written back into the location of the RAM addressed by register 21, overwriting the previous contents.
(7) If the signal PROPAGATE is true, then the above sequence is repeated from step (2). Otherwise the procedure is terminated.

It can be seen that the update procedure first updates the specified leaf node. It then traces a path up the tree towards the root node, until it reaches a node which does not need to be updated (i.e. one for which PROPAGATE is not true).

It will be appreciated that the apparatus described above can easily be extended to accommodate any desired number of items by a suitable choice of tree structure. In general, if the branching factor of the tree is b (assumed to be equal to a power of 2 for simplicity), and the depth of the tree (i.e. the number of times the tree branches) is d, then there are $N=b^d$ leaves. Such a tree can be held in a RAM having $2N/b$ locations, each containing b bits, with the nodes at level i stored in location $b^{i-1}$ to $2b^{i-1}-1$. In this general case, the control register 25 has $\log_2 b$ bits, and the address register 21 is shifted by this number of bit positions at step (5) of the search procedure and step (2) of the update procedure.

It can be seen that, in general, the number accesses to the RAM required to locate a set leaf will be $\log_b N$, rounded up to the nearest whole number, and that this may locate up to b set leaves at the same time.

I claim:

1. Search apparatus comprising:
   (a) means for maintaining a representation of a tree structure comprising a plurality of interconnected nodes including a root node and a plurality of terminal nodes, each node being set to a predetermined state if any one of its subordinate nodes is set in a predetermined state, and
   (b) means for following a path through the tree, starting from the root node and passing through a series of nodes all of which are set in their predetermined states until a terminal node in its predetermined state is reached,
   (c) wherein the means for maintaining the representation of the tree structure comprises a random-access memory having a plurality of individually addressable locations each of which holds a plurality of bits, each node of the tree other than the root node being represented by one of said bits,
   (d) wherein each location in the random-access memory contains b bits, and a node represented by bit y of locations x of the memory has b subordinate nodes represented by the b bits in location $bx+y$ of the memory,
   (e) and wherein the means for following a path through the tree comprises an address register for addressing the random-access memory with an address x, to read out a word from location x of the memory, means for examining the word read out the memory to determine whether any of its bits is set and means operable in the event that bit y is set to replace the address x in the register by a new address $bx+y$.

2. Search apparatus according to claim 1 wherein the means for examining the word read out of the memory comprises a priority encoder which produces a code indicating the bit position y of the first set bit, if any, in that word.

3. Search apparatus according to claim 1 including means for updating the representation of the tree structure, comprising means for dividing the contents $bx+y$ of the address register by b to produce an address x and a remainder y, and for updating bit y of location x of the random-access memory.

4. Search apparatus according to claim 3 wherein the means for updating includes logic means for detecting a condition wherein either:
   (a) all the bits in the currently addressed location of the memory were originally unset and the updating means has just set one of them, or
   (b) all but one of the bits in the currently addressed location of the memory were originally unset and the updating means has just unset that one bit.

5. A method of locating, in a collection of items, an item which satisfies a predetermined criterion, comprising the steps:
   (a) maintaining a representation of a tree structure comprising a plurality of interconnected nodes including a root node and a plurality of terninal nodes, each terminal node corresponding to one of said items,
   (b) setting each terminal node to a predetermined state if the corresponding item satisfies said criterion,
   (c) setting each node other than a terminal node to a predetermined state if any of its subordinate nodes is set in its predetermined state, and
   (d) following a path through the tree, starting from the root node and passing through a series of nodes all of which are set in their predetermined states until a terminal node in its predetermined state is reached, wherein the representation of the tree structure is maintained in a random-access memory having a plurality of individually addressable locations each of which holds a plurality of bits, each node of the tree other than the root node being represented by one of said bits, wherein each location of the random-access memory contains b bits and a node represented by bit y of location x of the memory has its b subordinate nodes represented by the b bits in location $bx+y$ of the memory, and wherein the stepof following a path through the tree comprises the sub-steps:
   (i) addressing the random-access memory with an address x to read out a word from location x of the memory, and
   (ii) examining the work read out of the memory to determine whether any of its bits are set and, if bit y is set, forming a new address $bx+y$.

6. A method according to claim 5 inclduing the further steps:
   (a) dividing an address $bx+y$ by b to produce a new address x and a remainder y
   (b) using the new address x and the remainder y to access bit y of location x of the memory, to update that bit, and
   (c) if either:
   (i) all the bits in location x of the memory were originally unset and one of them has just been set, or
   (ii) all but one of the bits in location x of the memory were originally unset and that one bit has just been unset, repeating steps (a) and d (b) above, using the new address x in place of the previous address $bx+y$.

* * * * *